US008320529B2

(12) United States Patent
Lin et al.

(10) Patent No.: US 8,320,529 B2
(45) Date of Patent: Nov. 27, 2012

(54) SENDING URGENT MESSAGES TO MULTIPLE RECIPIENTS VIA A SINGLE CALL

(75) Inventors: Mei-Jong Lin, Silver Spring, MD (US); Chieh-Chien Lin, Gaithersburg, MD (US)

(73) Assignee: Verizon Services Corp., Ashburn, VA (US)

( * ) Notice: Subject to any disclaimer, the term of this patent is extended or adjusted under 35 U.S.C. 154(b) by 381 days.

(21) Appl. No.: 11/355,067

(22) Filed: Feb. 16, 2006

(65) Prior Publication Data

US 2007/0201627 A1 Aug. 30, 2007

(51) Int. Cl.
*H04M 1/64* (2006.01)
*H04M 7/00* (2006.01)
(52) U.S. Cl. .............. 379/67.1; 379/221.08; 379/221.09
(58) Field of Classification Search .............. 379/37–41, 379/88.12, 88.16, 48, 51, 112.01, 138, 67.1, 379/221.03, 69, 221.11, 221.08, 221.09; 709/200; 340/533, 539.1; 455/414, 414.3, 455/466, 404.1, 414.03
See application file for complete search history.

(56) References Cited

U.S. PATENT DOCUMENTS

| | | | | |
|---|---|---|---|---|
| 5,029,290 A * | 7/1991 | Parsons et al. | ................ | 340/533 |
| 5,260,986 A * | 11/1993 | Pershan | ..................... | 455/413 |
| 5,537,466 A * | 7/1996 | Taylor et al. | ............ | 379/221.11 |
| 5,841,848 A * | 11/1998 | Dunn | ........................... | 379/138 |
| 6,509,833 B2 * | 1/2003 | Tate | ........................... | 340/539.1 |
| 6,522,876 B1 * | 2/2003 | Weiland et al. | ............ | 455/414.1 |
| 6,608,886 B1 * | 8/2003 | Contractor | ..................... | 379/45 |
| 6,650,891 B1 * | 11/2003 | Wierzbitzki et al. | ........ | 455/414.3 |
| 6,816,878 B1 * | 11/2004 | Zimmers et al. | .............. | 709/200 |
| 7,035,391 B2 * | 4/2006 | Cai et al. | .................. | 379/221.11 |
| 7,095,837 B1 * | 8/2006 | Pettifor et al. | ........... | 379/207.02 |
| 7,564,958 B1 * | 7/2009 | Contractor | ................. | 379/93.15 |
| 2002/0146101 A1 * | 10/2002 | Weik et al. | ................ | 379/112.01 |
| 2003/0138089 A1 * | 7/2003 | Sawada et al. | ........... | 379/210.01 |
| 2005/0243974 A1 * | 11/2005 | Pearson | ..................... | 379/37 |
| 2005/0266864 A1 * | 12/2005 | Chen et al. | ................... | 455/466 |
| 2006/0093101 A1 * | 5/2006 | Patel et al. | ................. | 379/88.16 |
| 2008/0261554 A1 * | 10/2008 | Keller et al. | ............... | 455/404.1 |

OTHER PUBLICATIONS

International Search Report for PCT Application PCT/IB07/50441, mailed Aug. 6, 2008.

* cited by examiner

*Primary Examiner* — Yuwen Pan
*Assistant Examiner* — Sonia Gay

(57) ABSTRACT

A first call is received at a reserved address and is forwarded based on the reserved address. A second call is placed to a designated address, and a message is played to the designated address.

20 Claims, 3 Drawing Sheets

SENDING URGENT MESSAGES TO MULTIPLE RECIPIENTS VIA A SINGLE CALL

BACKGROUND INFORMATION

A local populace may be at risk from a variety of possible events, ranging from security threats such as bombs and biochemical agents to environmental threats such as tsunamis, tornadoes, and forest fires. When such threats are present, it is clearly desirable that the local populace be informed as quickly and efficiently as possible. Similarly, organizations such as companies, schools, churches, etc. often have the need to convey information to employees, students, members, etc. quickly and efficiently. For example, in the event that schools or places of business are closed due to severe weather, it is desirable to be able to notify students, teachers, employees, etc. Other organizations may have other needs to convey news and information of various kinds to their members.

Presently, broadcast media are most often used to convey information about impending threats and events. For example, weather warnings, school closings, etc. are often broadcast by televisions and radio stations, or posted on the world wide web. Some organizations rely on pre-recorded telephone messages that their members may hear by calling a special number. Other organizations rely on "phone trees," in which one member calls one or more other members, who in turn relay a message to one or more other members, etc. However, all of the foregoing ways of providing information suffer from the drawback of requiring recipients to actively request or seek out the information by listening to the right broadcast at the right time, calling a special number to check a pre-recorded message, check a web site, etc. Phone trees are particularly disadvantageous, because they rely on multiple people to take the correct steps to provide important information to all community members.

Accordingly, it would be highly desirable to be able to proactively provide community members with important information in a way that does not depend on action by one or more of the community members to obtain or convey the information.

DETAILED DESCRIPTION OF THE PREFERRED EMBODIMENTS

According to certain embodiments a message such as an urgent message or other notification is sent to one or more users of a network. Such embodiments advantageously provide information to users rapidly and efficiently, and without requiring users to themselves take active or proactive steps. In general, an authorized individual wishing to send an urgent message or other notification may access a network, such as the public switched telephone network (PSTN), and provide instructions for the broadcast or transmission of the message to multiple users, whereupon the message is transmitted or broadcast. For example, in certain exemplary embodiments users receive a telephone call in which am urgent message is played when the telephone call is answered. Although reference is generally made herein to an "urgent message," it should be understood that the content of the message or notification may be any such content that may be transmitted or broadcast using the systems and methods disclosed herein.

Figure 1:
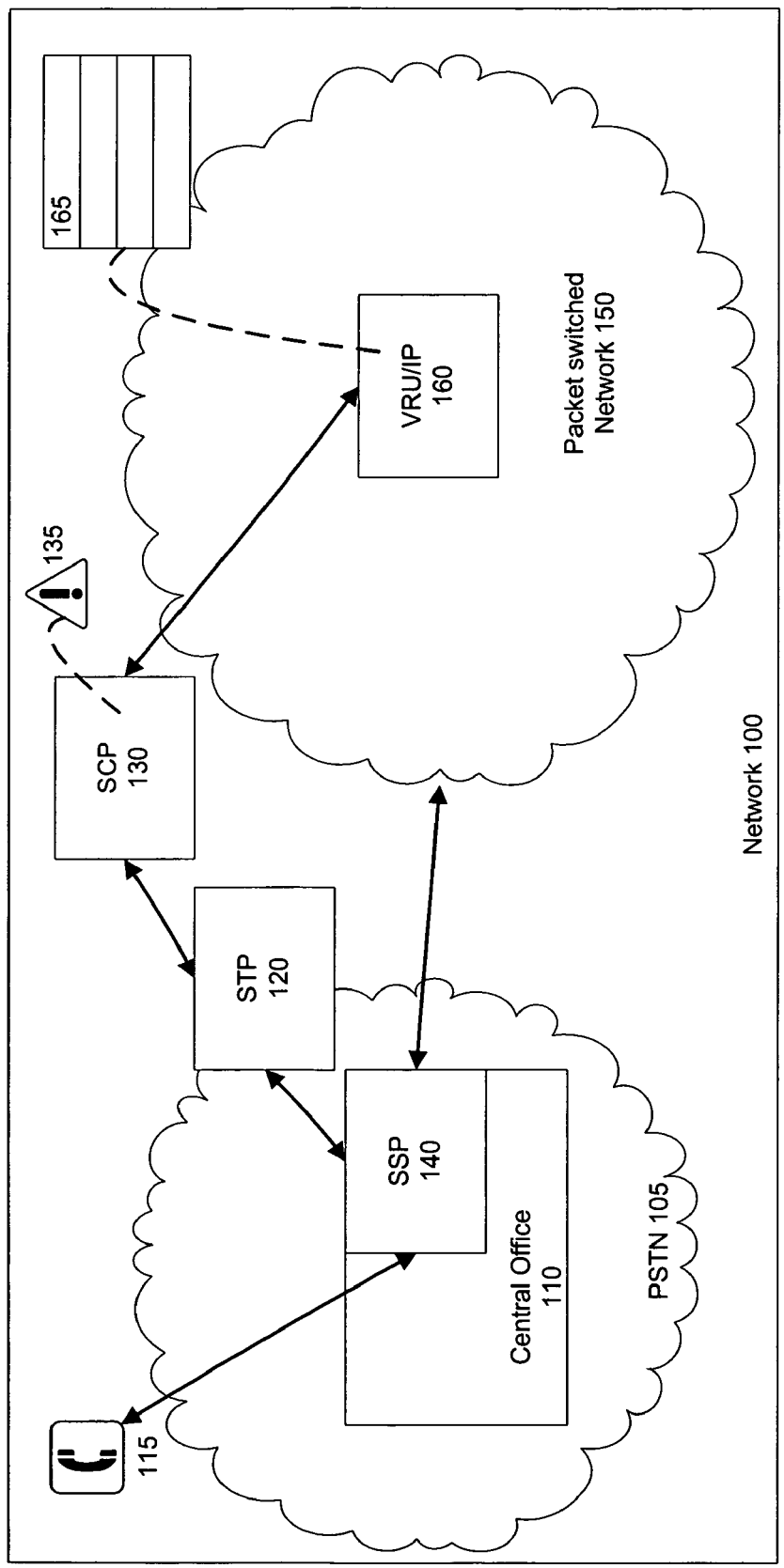
FIG. 1 illustrates certain telecommunications network elements that are used in an exemplary embodiment.

One embodiment uses known telecommunications network elements in a telecommunications network 100 as shown in FIG. 1. Central office 110 is known to those skilled in the art as part of public switched telephone network (PSTN) 105, and includes switching equipment that connects telephone users to each other, both locally and via long distance carriers. Those skilled in the art will recognize that central office 110 may receive calls 115 originating from within or without PSTN 105, e.g., from a conventional telephone, from a device on a packet-switched network such as the Internet, etc.

Signal transfer points (STPs) 120 act as an intermediary between central office 110 and service control points (SCPs) 130 for the purpose of establishing and terminating calls. Those skilled in the art will recognize that STP 120 is a specialized switch that provides access to a Signaling System 7 (SS7) network and provides routing for SS7 messages. As is further known and understood by those skilled in the art, Service Switching Point (SSP) 140 within central office 110 originates and terminates calls, receives and interprets messages for providing specific services to customers, and communicates with STP 120.

As is also known, SCP 130 is a node in the SS7 network that includes logic for handling requests for service, e.g., a database containing information concerning how requests for service should be handled. The operation of SCP 130, as well as the SS7 signaling by which SCP 130 communicates with other network elements, are generally well known. For example, SCP 130 receives and responds to requests for information concerning how calls should be handled, e.g., whether a call should be blocked, forwarded to another telephone number, etc. In most embodiments, SCP 130 stores an alert flag 135, discussed in further detail below in connection with FIG. 2, although embodiments are possible in which alert flag 135 is stored elsewhere. In general, alert flag 135 is a binary flag used to indicate a status of "alert on" or "alert off," where "alert on" indicates that a request has been made to send an urgent message to a list of recipients, and "alert off" simply indicates that no such request is pending.

Packet-switched network 150 is an internet protocol (IP) or other packet switched network known to those skilled in the art. Included within the network 150 is voice response unit/intelligent peripheral (VRU/IP) 160. VRU/IP 160 is known to those skilled in the art as a component of an intelligent network (IN) that generally includes a processor, a memory, and program instructions for providing one or more services to a user, such as playing an announcement.

VRU/IP 160 generally includes a recipient table 165, discussed further below in connection with FIG. 2, although embodiments are possible in which recipient table 165 is stored elsewhere. In general, recipient table 165 includes a list of addresses to receive an urgent message. For example, in one embodiment, table 165 includes a list of telephone numbers to receive an urgent message. Further, embodiments are possible in which individual users or sets of users to receive an urgent message are identified by input received from the party providing the urgent message. It should be understood that embodiments are possible in which the addresses listed in table 165 are not be telephone numbers, but could be some other kind of addresses, such as Internet Protocol addresses, other network addresses, etc.

Not shown in FIG. 1, but well known to those skilled in the art, are the one or more media gateways and softswitches used by the network 150 to communicate with the PSTN and to switch packet-based messages respectively.

It is to be understood that embodiments are possible, even likely, in which networks and/or network elements different from, or arranged differently than, those shown in FIG. 1 are included. For example, embodiments are contemplated that do not include PSTN 105 at all, but make use exclusively of one or more networks such as packet switched network 150. Further, those skilled in the art will recognize that various elements within PSTN 105 and network 150, such as SCP 130 and VRU/IP 160, include a processor capable of executing instructions such as computer-executable instructions, and one or more media capable of storing data including instructions executable by the processor. Accordingly, it is to be understood that various embodiments, such as those disclosed herein, may be practiced by executing a sequence of computer-executable instructions in one or more elements of PSTN 105 and/or network 150.

Figure 2:
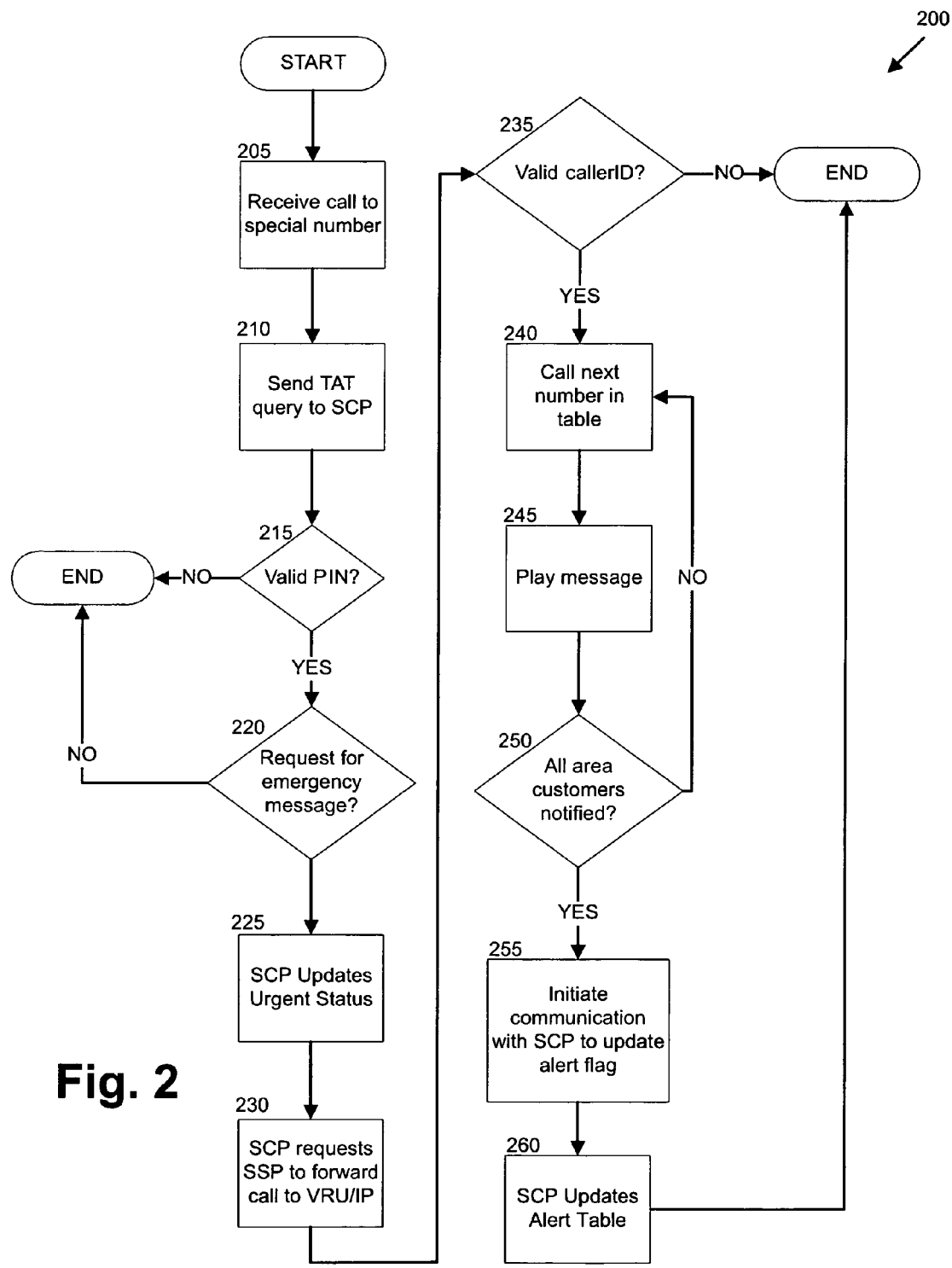
FIG. 2 depicts a process flow for providing an urgent message to a telecommunications network and for sending the message to users of a network, according to an embodiment.

FIG. 2 depicts a process flow 200 for providing an urgent message to a telecommunications network 100 and for sending the message to users of the network 100, according to an embodiment.

In step 205, a call 115 is directed to a reserved address, for example, a telephone number in central office 110, although those skilled in the art will recognize kinds of addresses other than telephone numbers, e.g., Internet Protocol (IP) addresses, to which calls 115 may be directed.

Next, in step 210, SSP 140, upon receiving the call 115 placed in step 205, sends a termination attempt trigger (TAT), known to those skilled in the art, to SCP 130 (via STP 120, as will be recognized by those skilled in the art).

Next, in step 215, the identity of the person or entity making the incoming call 115 is validated. Those skilled in the art will recognize that there are various ways in which this validation may be performed. For example, in conjunction with VRU/IP 160, it is possible to prompt the caller to enter a personal identification number (PIN). As will be understood by those skilled in the art, SCP 130 may be programmed to recognize that a PIN should be used to validate a caller when a call to a particular telephone number is received. Accordingly, SCP 130 may initiate a connection between VRU/IP 160 and SSP 140 in central office 110 for the purpose of receiving a caller's PIN. Upon receiving PIN digits input by the caller from SSP 140, VRU/IP 160 then transmits the digits to SCP 130 for validation. It is also possible to have a caller speak a password that is validated using known voice recognition technologies. In any event, this validation step, while not present in all embodiments, is desirable for the purpose of ensuring that only legitimate callers may initiate emergency call broadcasts as disclosed and claimed herein.

If, in step 215, the identity of the person or entity that placed the call in step 205 cannot be validated, then the process 200 terminates. Otherwise, control proceeds to step 220.

In step 220, the person or entity making the call 115 may be requested to confirm that the caller intended to request that an urgent message be sent to multiple recipients. This step, like step 215, is optional, but desirable for the purpose of ensuring that urgent messages are not inadvertently or unintentionally sent. Those skilled in the art will understand that this confirmation may be performed in various ways, such as those discussed above regarding step 215. If the caller does not confirm that an urgent message should be sent, the process 200 terminates. Otherwise, control proceeds to step 225.

In step 225, SCP 130 updates an alert flag 135 stored in SCP 130 to indicate the presence of an urgent message. Such a flag 135 or alert indicator may be stored, for example, in a table, or in any other manner known to those skilled in the art.

Next, in step 230, STP 140, at the request of SCP 130, sends the call 115 received in step 205 to VRU/IP 160. Those skilled in the art will recognize that SCP 130 may include logic to associate a particular predefined call identifier (caller ID) with a call. Such logic is used in step 230 so that, when the call 115 is sent to VRU/IP 160, a caller ID is associated with the call 115. Accordingly, the call 115 may be validated by VRU/IP 160 as a call 115 that is validly requesting an urgent message.

Next, in step 235, VRU/IP 160 determines whether the caller ID associated with the call 115 in step 230 is valid, i.e., whether the caller ID is a caller ID that has been predefined to be associated with a call 115 initiating a urgent message to multiple recipients. If the caller ID is not valid, the process 200 terminates. Otherwise, control proceeds to step 240.

In step 240, VRU/IP 160 consults recipient table 165 containing a list of telephone numbers or other addresses to which the urgent message requested by the call received in step 205 should be sent. If the urgent message has not been to provided to any of the telephone numbers in the recipient table 165, a call 115 is placed to the first number in the table 165; otherwise, a call 115 is placed to the first number in the recipient table 165 to which the message has not been provided. As will be understood by those skilled in the art, VRU/IP 160 may place calls through central office 110, although embodiments are possible in which VRU/IP 160 places calls directly, e.g. over packet-switched network 150.

Next, in step 245, the urgent message is played when the call 115 placed in step 240 is answered.

Next, in step 250, VRU/IP 160 determines whether further telephone numbers in the recipient table 165 remain to be notified with the urgent message. If so, control returns to step 240. If not, control proceeds to step 255.

With regard to steps 240 through 250, those skilled in the art will understand that VRU/IP 160 will likely be capable of making multiple calls simulataneously. For example, one embodiment employs more than one VRU/IP 160, and each VRU/IP 160 comprises ninety primary rate interfaces (PRIs) known to those skilled in the art. As is further known to those skilled in the art, each PRI has available twenty-three outbound channels, meaning that a single VRU/IP 160 can simultaneously place two-thousand and seventy outbound calls. Accordingly, in most embodiments steps 240 through 250 will occur simultaneously with respect to a plurality of addresses in recipient table 165.

In step 255, VRU/IP 160 sends a message to SCP 130 to update the alert flag 135 to indicate that alert status is off, i.e., because the urgent message requested by the call 115 received in step 205 has now been sent to all specified users, the alert flag 135 should no longer indicate that an urgent message is to be sent.

Next, in step 260, SCP 130 updates the alert flag 135 to indicate that alert status is off.

Following step 260, the process 200 ends.

Figure 3:
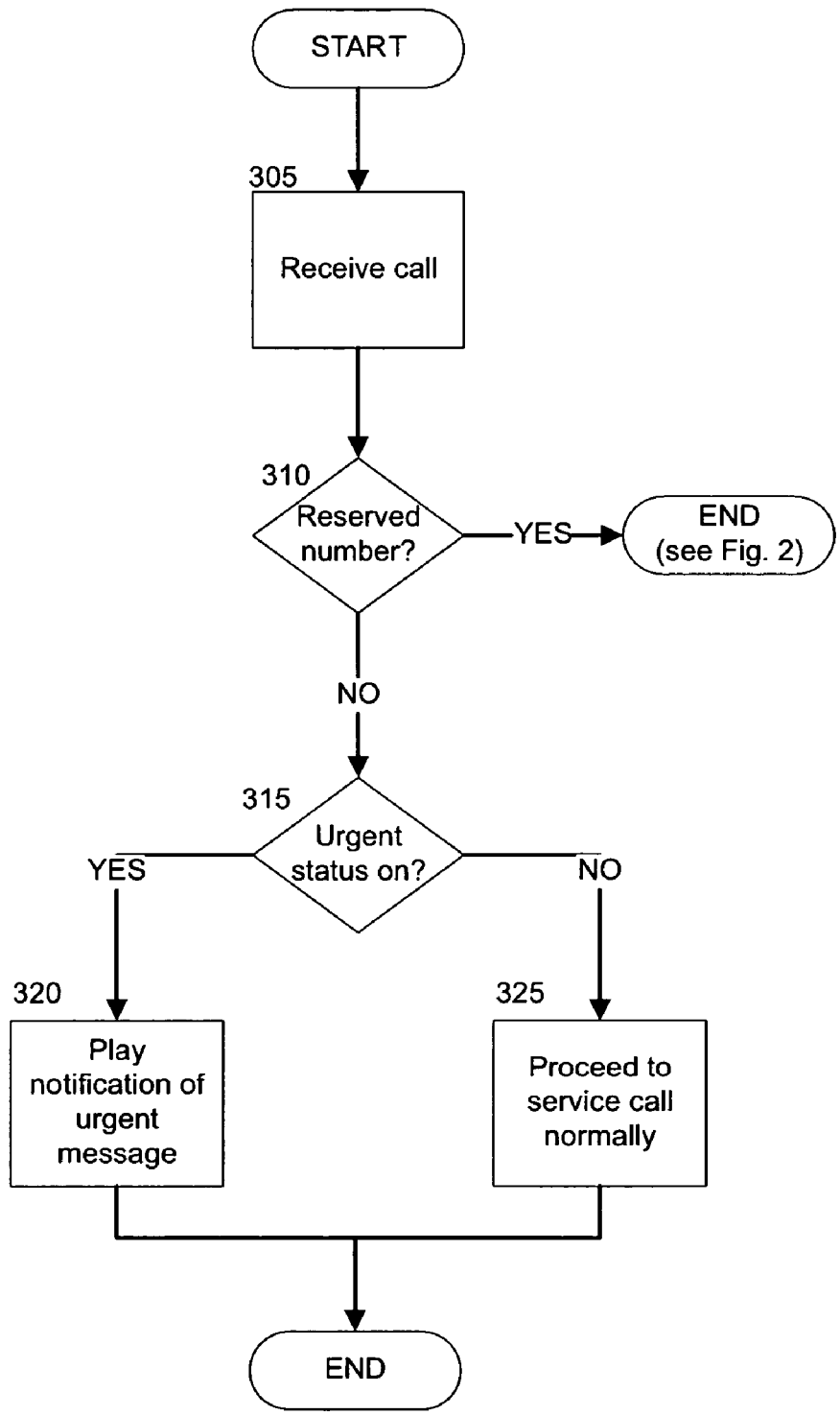
FIG. 3 depicts a process flow illustrating the use of an alert flag, according to an embodiment.

FIG. 3 depicts a process flow 300 illustrating the use of alert flag 135, according to an embodiment. It should be understood that the purpose of the alert flag 135 is to ensure that, when an urgent message is to be sent, or is being sent, that appropriate processing occurs to ensure minimal interference with the sending of the urgent message.

In step 305, a call 115 is received in central office 110 and forwarded to SCP 130 for handling by SSP 140.

Next, in step 310, SCP 130 determines whether the call 115 received in step 305 is a call to a number reserved for requesting urgent messages. If so, the process 300 terminates and, in most embodiments, the process 200 is initiated. Otherwise, control proceeds to step 315.

In step 315, SCP 130 checks alert flag 135. If the flag 135 indicates "alert on" status, control proceeds to step 320. Otherwise, alert flag 135 indicated "alert off" status, and control proceeds to step 325.

In step 320, SCP 130 sends the call 115 back to SSP 140 with instructions to play a message informing the caller that an emergency situation exists and that the caller should terminate the call (e.g., hang up) to conserve network resources. Preferably, to conserve network resources in a time when an emergency situation may exist, the message played to the caller is as brief as possible.

In step 325, the call 115 is processed according to normal procedures, i.e., procedures followed when alert flag 135 is set to "alert off" status.

Next, following either of steps 320 or 325, the process 300 ends.

CONCLUSION

With regard to the processes, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    receiving a first call at an address reserved for requesting urgent messages, the first call indicating that an urgent message is to be sent to a plurality of designated addresses;
    updating an alert flag stored by a service control point based on the first call to indicate the presence of an urgent message;
    forwarding the first call to a voice response unit/intelligent peripheral based on the reserved address;
    placing calls by the voice response unit/intelligent peripheral to at least two of the plurality of designated addresses;
    for each one of the placed calls, playing the urgent message by the voice response unit/intelligent peripheral when the placed call is answered;
    receiving an indication from the voice response unit/intelligent peripheral when no further designated addresses remain to be notified; and
    updating the alert flag stored by the service control point to no longer indicate that the urgent message is to be sent based on the indication.

2. The method of claim 1, further comprising validating a caller placing the first call.

3. The method of claim 1, further comprising:
    receiving a second call;
    checking the alert flag to determine an alert status; and
    processing the second call according to the alert status.

4. The method of claim 1, further comprising associating a call identifier with the first call prior to the forwarding step.

5. The method of claim 4, further comprising checking the call identifier, and playing the message only if the call identifier is validated.

6. The method of claim 1, wherein the reserved address and the designated address are telephone numbers.

7. A system, comprising:
    a central office configured to receive a first call to an address reserved for requesting urgent messages and to forward the first call based on the reserved address;
    a voice response unit/intelligent peripheral connected to the central office and configured to receive the first call, the first call indicating that an urgent message is to be sent to a plurality of designated addresses, (b) place calls to at least two of the plurality of designated addresses, and (c) for each one of the placed calls, play the urgent message when the call is answered; and
    a service control point connected to the central office and configured to receive the first call from the central office and to cause the first call to be forwarded to the voice response unit/intelligent peripheral,
    wherein the service control point stores an alert flag indicating a pending request to transmit the urgent message to the plurality of designated addresses, such that (a) when the first call is received the service control point updates the alert flag to indicate the presence of the urgent message and (b) when the service control point receives an indication from the voice response unit/intelligent peripheral that no further designated addresses of the plurality of designated addresses remain to be notified, the service control point updates the alert flag to no longer indicate that the urgent message is to be sent.

8. The system of claim 7, wherein the service control point is configured to check the alert flag upon receiving a second call.

9. The system of claim 7, further comprising a call identifier, wherein the service control point is configured to associate the call identifier with the first call before the first call is forwarded.

10. The system of claim 9, wherein the voice response unit/intelligent peripheral is configured to check the call identifier, and further wherein the voice response unit/intelligent peripheral is configured to play the urgent message only if the call identifier is validated.

11. The system of claim 7, wherein the voice response unit/intelligent peripheral is further configured to validate a caller placing the first call.

12. The system of claim 7, wherein the reserved address and the designated address are telephone numbers.

13. A non-transitory computer-readable medium comprising a set of computer-executable instructions, the instructions being executable by a processor to provide instructions comprising:
- receiving a first call indicating that an urgent message is to be sent to a plurality of designated addresses;
- determining that the first call was to an address reserved for requesting urgent messages;
- updating an alert flag stored by a service control point based on the first call to indicate the presence of an urgent message;
- forwarding the first call to a voice response unit/intelligent peripheral;
- placing calls by the voice response unit/intelligent peripheral to at least two of the plurality of designated addresses;
- for each one of the placed calls, playing the urgent message by the voice response unit/intelligent peripheral when the placed call is answered;
- receiving an indication from the voice response unit/intelligent peripheral when no further designated addresses remain to be notified; and
- updating the alert flag stored by the service control point to no longer indicate that the urgent message is to be sent based on the indication.

14. The medium of claim 13, the instructions being further executable to provide operations comprising validating a caller placing the first call.

15. The medium of claim 13, the instructions being further executable to provide operations comprising:
- receiving a second call;
- checking the alert flag to determine an alert status: and
- processing the second call according to the alert status.

16. The medium of claim 13, further the instructions being further executable to provide operations comprising checking a call identifier associated with the first call, and for playing the message only if the call identifier is validated.

17. The medium of claim 13, wherein the reserved address and the designated address are telephone numbers.

18. The method of claim 3, further comprising:
- if the alert status indicates that the request is pending and if the second call is not addressed to an address reserved for requesting urgent messages, playing a second message informing a source of the second call to terminate the second call to conserve network resources; and
- otherwise, processing the second call.

19. The system of claim 8, wherein the service control point is further configured to:
- if the alert status indicates that the request is pending and if the second call is not addressed to an address reserved for requesting urgent messages, play a second message configured to inform a source of the second call that the second call should be terminated to conserve network resources; and
- otherwise, process the second call.

20. The medium of claim 15, the instructions being further executable to provide operations comprising:
- if the alert status indicates that the request is pending and if the second call is not addressed to an address reserved for requesting urgent messages, playing a second message informing a source of the second call to terminate the second call to conserve network resources; and
- otherwise, processing the second call.

* * * * *